Oct. 16, 1951     P. H. LEGARRA     2,571,264
SWIVEL SPOON
Filed June 18, 1949
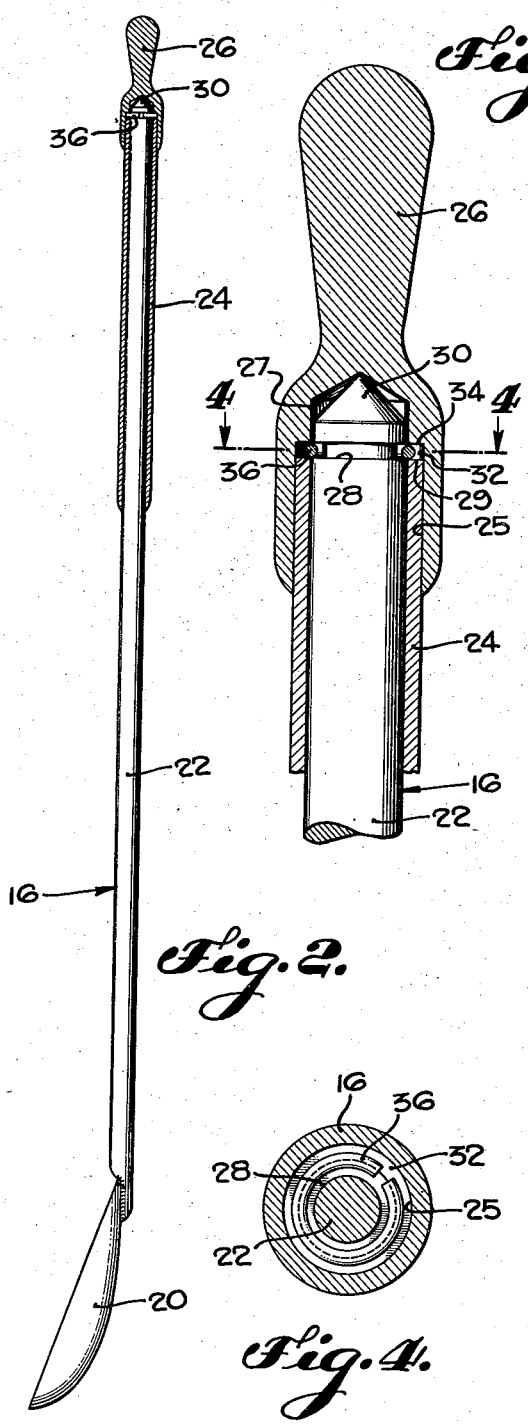
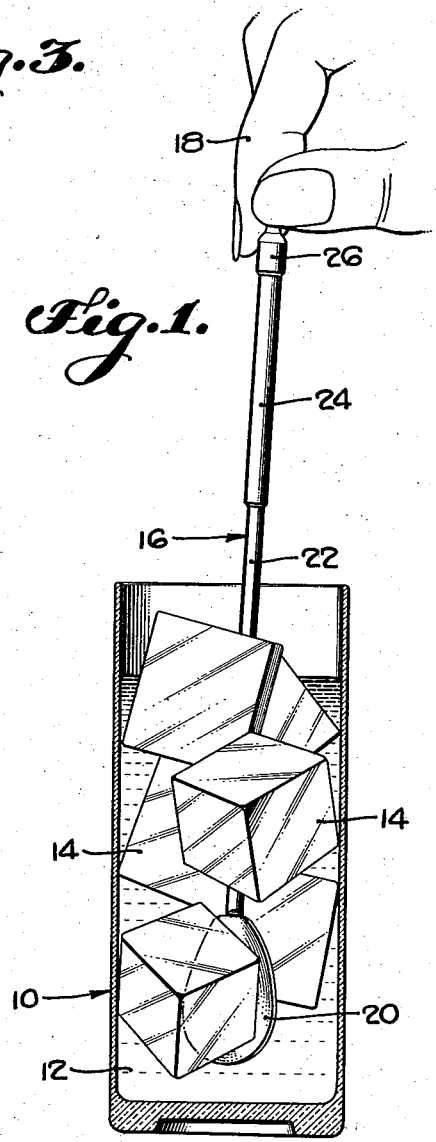
PHILIP H. LEGARRA,
INVENTOR.
BY Lyon & Lyon
ATTORNEYS Patented Oct. 16, 1951

2,571,264

UNITED STATES PATENT OFFICE 2,571,264

SWIVEL SPOON

Philip H. Legarra, West Los Angeles, Calif., assignor of one-half to James E. McPhee, Culver City, Calif.

Application June 18, 1949, Serial No. 99,949

2 Claims. (Cl. 259—144)

This invention relates to spoons and particularly to stirring spoons.

Heretofore the ordinarily constructed spoon has for centuries consisted of a spoon proper and a handle rigidly affixed thereto. The handle may have been integral with the spoon or may comprise a separate piece welded or otherwise secured to said spoon proper. Such an instrument is perfectly adapted to its ordinary task of spooning and in most instances performs sufficiently as a stirring implement. However, in such stirring it will be appreciated that there is no relative movement between the spoon proper and the handle and for this reason difficulties occur where the substance being stirred includes matter, objects, and the like which obstruct the movement of the spoon. Such a substance is found most frequently in the field of iced beverages such as iced tea, coffee and alcoholic mixtures chilled by ice. In stirring such substances with the ordinary spoon, the crowded condition of the ice frequently causes a jamming of the stirring spoon, said spoon being rendered substantially immovable with respect to the various pieces of ice and necessarily rotating together with such ice. This requires rotation of the spoon with respect to the hand holding the spoon and has led to the necessity of the development of special techniques of stirring where considerable numbers of iced beverages are purveyed, as for example, in the bartending art. Here, where numerous alcoholic, ice-containing beverages are being prepared, speed is essential, and rapid and efficient stirring comprises a considerable problem. In the bartender's art there has, as a consequence, developed the technique known as "twiddling," which consists in stirring with the ordinary spoon while permitting the handle of the spoon to rotate freely with respect to the fingers which are holding said spoon. Such "twiddling" demands considerable skill and is not always effective where particular configurations of the ice exist and where unusually large amounts of ice are present in the beverage.

While spoons having rotatable handle portions or sleeve portions have been heretofore devised, such spoons have not been entirely satisfactory inasmuch as they have required a holding of the spoon in inconvenient positions, have posed undesirable production problems, and have not been so constructed as to provide dependable free rotation between the rotatable parts, i. e., the construction of such spoons has been such that the bearing portions between the rotatable handle or sleeve and the spoon itself provide considerable friction and are not protected from the outside environment in such a way as to prevent binding of the bearing surfaces by virtue of food particles, dirt, and the like.

It is therefore the principal object of this invention to devise a novel spoon which permits the stirring of an iced beverage without resort to "twiddling."

It is a further object of this invention to provide a stirring spoon with which the spoon holder may stir an iced beverage without having to permit the holder portion of the spoon to rotate with respect to the fingers.

Yet another of the objects of this invention is to provide a stirring spoon by which the spoon holder may stir an iced beverage, yet during such stirring hold the holder portion firmly in the fingers.

Another of the objects of this invention is to provide a stirring spoon having a rotatable holder portion in such position as to provide it convenient for the user to hold the spoon near or at the top thereof for stirring purposes.

Still another of the objects of this invention is to provide a stirring spoon having a rotatable holder which is readily and cheaply produced, wherein those bearing surfaces which might bind or otherwise prevent rotation of the holder on the spoon are minimized and substantially frictionless, and wherein said bearing surfaces are enclosed and protected from the environment in which the spoon is used.

Further objects of the invention will appear hereinafter.

In the drawings:

Figure 1 shows a perspective view of a spoon incorporating the invention, said spoon being in stirring position within the ice-containing beverage.

Figure 2 shows a side elevational view of said spoon, partly in section.

Figure 3 shows a partial longitudinal sectional view of the upper portion of said spoon.

Figure 4 shows a cross-sectional view of said spoon taken on the line 4—4 of Figure 3.

Referring to the drawings, there is shown a beverage glass 10 containing a beverage 12 and ice cubes 14; said iced beverage has dipped in it the stirring spoon 16, the spoon proper portion of which, as will be observed, is tangled in the pieces of ice 14. A hand 18 is shown holding the spoon.

The spoon 16 consists of a spoon proper or stirring element 20, a lengthy handle portion 22 affixed to said spoon by welding or in other common manner, a sleeve 24 and a head portion or holder 26. The handle portion 22 at its extremity opposite from the spoon proper 20 is provided with a groove 28 and may have an end 30 beveled to a point. The sleeve 24 is slidable on said handle portion 22 and is press-fitted into a counterbore 25 in the handle 26, the bore 27 therein slidably receiving the extremity of the handle portion 22. In the assembly of the spoon, the sleeve 24 is press-fitted into the handle 26, leaving an annular space 32 between the shoulder 34 of the counterbore 25 and the extremity 29 of said sleeve 24. A split snap ring 36 is placed in the groove 28 of the handle portion 22 whereupon the handle portion 22 is slid into the sleeve 24. When the said groove 28 and its snap ring 36 reach the space 34, said snap ring, as is obvious, locks the handle portion 22 longitudinally within the head portion 26 and sleeve 24, leaving said handle portion and therefore the spoon proper rotatable with respect to the said sleeve 24 and head portion 22.

Thus the spoon holder, as shown in Figure 1, is able to grasp the spoon by the head portion 22 and stir the beverage 12. As in the past in this stirring operation the ice 14 will jam about the spoon proper 20 and said spoon proper 20 and the ice, the beverage and the handle portion 16 will revolve as a unit. However, inasmuch as the head portion 26 of the spoon is rotatable with respect to the handle portion 16, the operator need not "twiddle" but may grasp the said head portion 26 firmly during the stirring. This enables the easy stirring of a number of ice-chilled beverages and the rapid mixing of a quantity of such beverages, avoids the necessity of developing the "twiddling" technique, and avoids any chance of inadvertent delay or spilling in stirring.

While there has been described what is at present considered a preferred embodiment of the present invention, it will be apparent to those skilled in the art that various modifications and changes may be made without departing from the essence of the invention, and it is intended to cover herein all such modifications and changes as come within the true scope and spirit of the appended claims.

I claim:

1. A spoon comprising in combination: a head portion, said head portion being bored and counterbored; a sleeve rigidly secured within the counterbore of said head portion a distance sufficient to leave a space in the extremity of said counterbore; a handle portion, said handle portion being grooved adjacent its one extremity, said handle portion slidably extending into said sleeve with said grooved extremity of said handle portion registering with said counterbore space; a snap ring carried by said grooved extremity extending into said space to lock said handle portion rotatably within said head portion; and a stirring element rigidly affixed to the other extremity of said handle portion.

2. A spoon comprising in combination: a stirring element; a handle portion rigidly affixed to said spoon at its lower extremity and having a pointed upper extremity; a sleeve about said handle portion rotatable with respect thereto; a bored head portion adapted to receive said handle portion and said sleeve, said bore having a tapered end and said sleeve being rigidly secured within said head portion; and a locking element adapted to secure said handle portion within said head portion, the pointed extremity of said handle portion being received in said tapered bore.

PHILIP H. LEGARRA.

REFERENCES CITED

The following references are of record in the file of this patent:

UNITED STATES PATENTS

| Number | Name | Date |
| --- | --- | --- |
| 1,272,506 | Olander | July 16, 1918 |
| 2,396,975 | Verbrugge | Mar. 19, 1946 |